(12) United States Patent
Shinagawa

(10) Patent No.: US 12,132,873 B2
(45) Date of Patent: Oct. 29, 2024

(54) PRINT CONTROL APPARATUS AND METHOD FOR CONTROLLING THE SAME COMPRISING RESTRICTING THE OUTPUT OF INPUT PRINT DATA WHEN PREDETERMINED TEXT DATA IS INCLUDED IN THE INPUT PRINT DATA

(71) Applicant: CANON KABUSHIKI KAISHA, Tokyo (JP)

(72) Inventor: Kazutaka Shinagawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/446,377

(22) Filed: Aug. 8, 2023

(65) Prior Publication Data
US 2024/0073331 A1    Feb. 29, 2024

(30) Foreign Application Priority Data
Aug. 23, 2022    (JP) .................................. 2022-132246

(51) Int. Cl.
  *H04N 1/44*    (2006.01)
  *H04N 1/00*    (2006.01)
  *G06F 3/12*    (2006.01)
(52) U.S. Cl.
  CPC ......... *H04N 1/0044* (2013.01); *H04N 1/0048* (2013.01); *H04N 1/0084* (2013.01); *H04N 1/00875* (2013.01)

(58) Field of Classification Search
  CPC .. H04N 1/0044; H04N 1/0048; H04N 1/0084; H04N 1/00875
  USPC ........................... 358/1.11–1.18; 726/19, 21
  See application file for complete search history.

(56) References Cited

U.S. PATENT DOCUMENTS

| 2008/0104707 | A1* | 5/2008 | Saka .................. H04N 1/00875 726/26 |
| 2009/0174890 | A1* | 7/2009 | Shigehisa ............. G06F 21/608 358/1.14 |
| 2010/0046015 | A1* | 2/2010 | Whittle ................. G06F 21/608 358/1.9 |
| 2012/0159618 | A1* | 6/2012 | Ohba .................... G06F 21/608 726/19 |
| 2022/0405031 | A1* | 12/2022 | Araki ................. H04N 1/00843 |

FOREIGN PATENT DOCUMENTS

| JP | 2007164271 A | 6/2007 |
| JP | 2010049520 A | 3/2010 |

* cited by examiner

*Primary Examiner* — Chad Dickerson
(74) *Attorney, Agent, or Firm* — Canon U.S.A., Inc. IP Division

(57) ABSTRACT

A print control apparatus includes an output unit configured to output, in a case where predetermined text data to be restricted from being output by censorship is determined to be included in input print data, information indicating output restriction of the input print data and information enabling identification of a page including the predetermined text data.

14 Claims, 9 Drawing Sheets

PRINT CONTROL APPARATUS AND METHOD FOR CONTROLLING THE SAME COMPRISING RESTRICTING THE OUTPUT OF INPUT PRINT DATA WHEN PREDETERMINED TEXT DATA IS INCLUDED IN THE INPUT PRINT DATA

BACKGROUND

Field of the Disclosure

The present disclosure relates to a print control apparatus and a method for controlling the print control apparatus.

Description of the Related Art

Places where printing apparatuses are installed and the users' environments have been diversifying. A printing apparatus can be accessed not only inside a firewall but also directly from an external network such as the Internet. Further, irrespective of the inside or outside of the firewall, an attack by a fraudulent operation of a printing apparatus by a malicious user, and information leakage such as loss of a print document have become issues.

As one of security measures for printing apparatuses, censorship of content of print documents is known.

Japanese Patent Application Laid-Open No. 2010-49520 discusses a technique of censoring whether a pre-registered keyword is included in print data in a period after printing is requested and before the printing is performed.

Japanese Patent Application Laid-Open No. 2007-164271 discusses a technique of censoring whether a pre-registered keyword is included in print data on a personal computer (PC) immediately after the print data is input, and performing printing after text found to match the pre-registered keyword in the censorship is notified with a thumbnail and is checked.

SUMMARY

According to an aspect of the present disclosure, a print control apparatus includes an output unit configured to output, in a case where predetermined text data to be restricted from being output by censorship is determined to be included in input print data, information indicating output restriction of the input print data and information enabling identification of a page including the predetermined text data.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. In the exemplary embodiments, a multifunction peripheral (MFP or digital MFP) having a hold print function will be described as an example. The hold print function is a function of temporarily holding a print job transmitted from, for example, a personal computer (PC) in a hard disk drive (HDD) of the multifunction peripheral or an external storage device without immediately outputting the print job from the multifunction peripheral. The hold print function is also used in a single-function peripheral (SFP) and thus an application range thereof is not limited to the multifunction peripheral.

Figure 1:
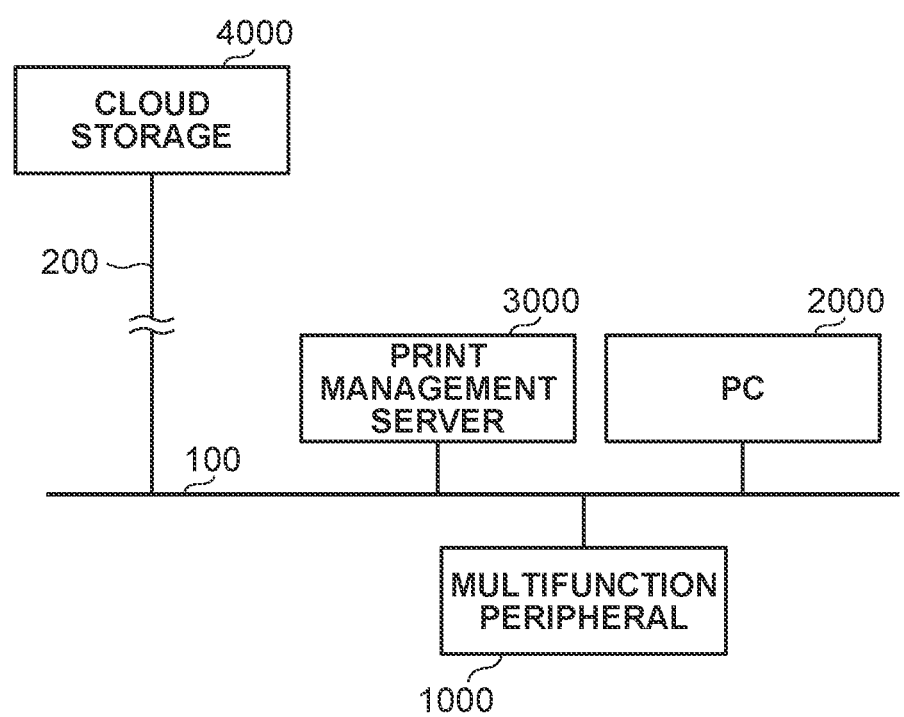
FIG. 1 is a diagram illustrating an example of a system configuration according to one or more aspects of the present disclosure.

FIG. 1 illustrates an example of a network configuration according to a first exemplary embodiment. A multifunction peripheral 1000 having a printing function of forming an image on a sheet can transmit and receive data, such as print data (also referred to as a print job), scanned image data, and device management information, to and from another information processing apparatus via a network 100. The multifunction peripheral 1000 is an example of an image forming apparatus. The multifunction peripheral 1000 is also an example of a print control apparatus.

The multifunction peripheral 1000 can communicate with a print management server 3000 and a PC 2000 via the network 100. The print management server 3000 and the PC 2000 can communicate with a cloud storage 4000, a file server, and the like via an external network 200. While one multifunction peripheral 1000, one print management server 3000, and one cloud storage 4000 are illustrated as an example in FIG. 1, the present exemplary embodiment is not limited thereto. Each of the apparatuses can be provided in plural. While the multifunction peripheral 1000 and the print management server 3000 are illustrated as separate apparatuses in FIG. 1, the multifunction peripheral 1000 can include the function of the print management server 3000.

Figure 2A:
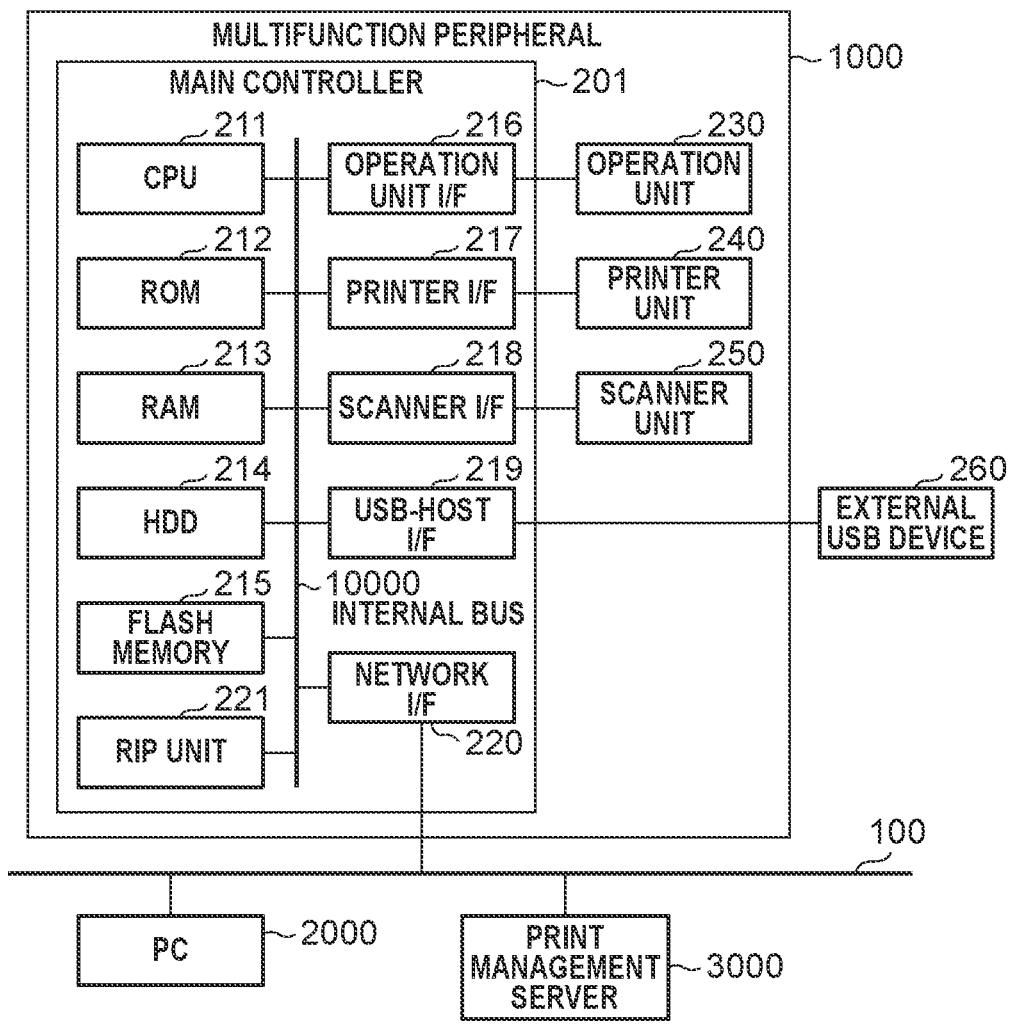
FIGS. 2A and 2B are block diagrams respectively illustrating examples of hardware configurations of a multifunction peripheral and a print management server according to one or more aspects of the present disclosure.

FIG. 2A is a block diagram illustrating an example of a hardware configuration of the multifunction peripheral 1000 according to the present exemplary embodiment. A central processing unit (CPU) 211 executes software programs of the multifunction peripheral 1000 to control an entire operation of the multifunction peripheral 1000. A read only memory (ROM) 212 stores a boot program and fixed parameters of the multifunction peripheral 1000. A random access memory (RAM) 213 is used to store programs and temporary data when the CPU 211 controls the multifunction peripheral 1000. An HDD 214 stores system software, applications, and various kinds of data. The CPU 211 executes the boot program stored in the ROM 212, loads the programs stored in the HDD 214 into the RAM 213, and executes the loaded programs to control the operation of the multifunction peripheral 1000.

A flash memory 215 stores a loader, a kernel, and applications. The flash memory 215 also stores, in addition to execution programs, license information for enabling the functions of the multifunction peripheral 1000, and a signature and a public key used in verification for program falsification detection. An operation unit interface (I/F) 216 transmits, to the CPU 211, an instruction input by a user of the multifunction peripheral 1000 through an operation unit 230. The operation unit I/F 216 also receives, from the CPU 211, processing content for switching the content displayed on the operation unit 230, and transmits the processing content to the operation unit 230. The operation unit 230 includes a liquid crystal display portion having a touch panel function and/or a keyboard, displays the status and operation menu of the multifunction peripheral 1000, and receives an instruction from the user.

A raster image processor (RIP) unit 221 performs rendering processing on print data to obtain a raster image. The present exemplary embodiment is applicable not only to a multifunction peripheral but also to an information processing apparatus such as a PC. Not only reduction of printing but also reduction of display can be considered.

A printer I/F 217 controls print processing by a printer unit 240. A scanner I/F 218 controls document reading by a scanner unit 250. A universal serial bus (USB)-host I/F 219 connects a main controller 201 and an external USB device 260. Examples of the external USB device 260 include a facsimile (FAX) unit. In a case where the external USB device 260 is the FAX unit, the external USB device 260 performs FAX transmission based on image data transferred from the HDD 214 via the USB-host I/F 219. The external USB device 260 also generates image data based on received data, and transfers the generated image data to the HDD 214 via the USB-host I/F 219. The image data stored in the HDD 214 is printed on a recording medium by the printer unit 240 as described above. Examples of the external USB device 260 further include a USB memory and a USB keyboard. An update file for firmware update can be transferred from the USB memory. A network I/F 220 controls transmission and reception of data to and from the network 100.

Figure 2B:
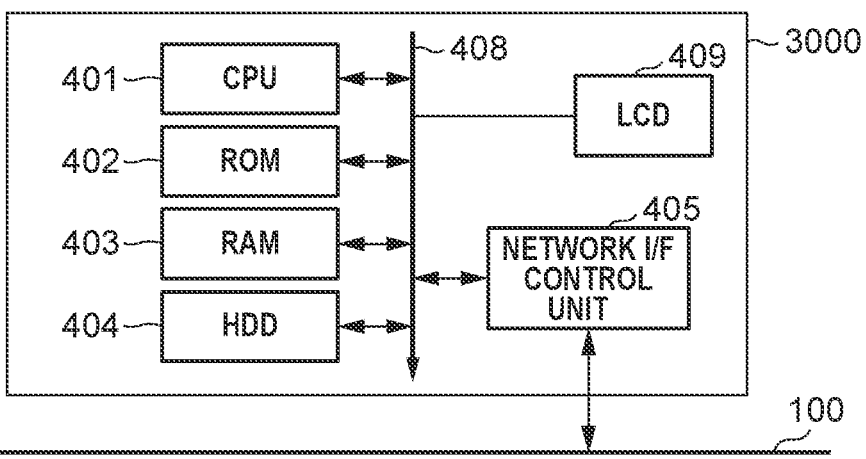

FIG. 2B is a block diagram illustrating an example of a hardware configuration of the print management server 3000 according to the present exemplary embodiment.

A CPU 401 executes software programs of the print management server 3000 to control an entire operation of the print management server 3000. A ROM 402 stores a boot program and fixed parameters of the print management server 3000. A RAM 403 is used to store programs and temporary data when the CPU 401 controls the print management server 3000. An HDD 404 stores system software, applications, and various kinds of data. The CPU 401 executes the boot program stored in the ROM 402, loads the programs stored in the HDD 404 into the RAM 403, and executes the loaded programs to control the operation of the print management server 3000. A network I/F control unit 405 controls transmission and reception of data to and from the network 100.

A bus 408 mutually connects the CPU 401, the ROM 402, the RAM 403, the HDD 404, and the network I/F control unit 405. A control signal from the CPU 401 and a data signal from each of the components are transmitted and received via the bus 408.

Figure 3A:
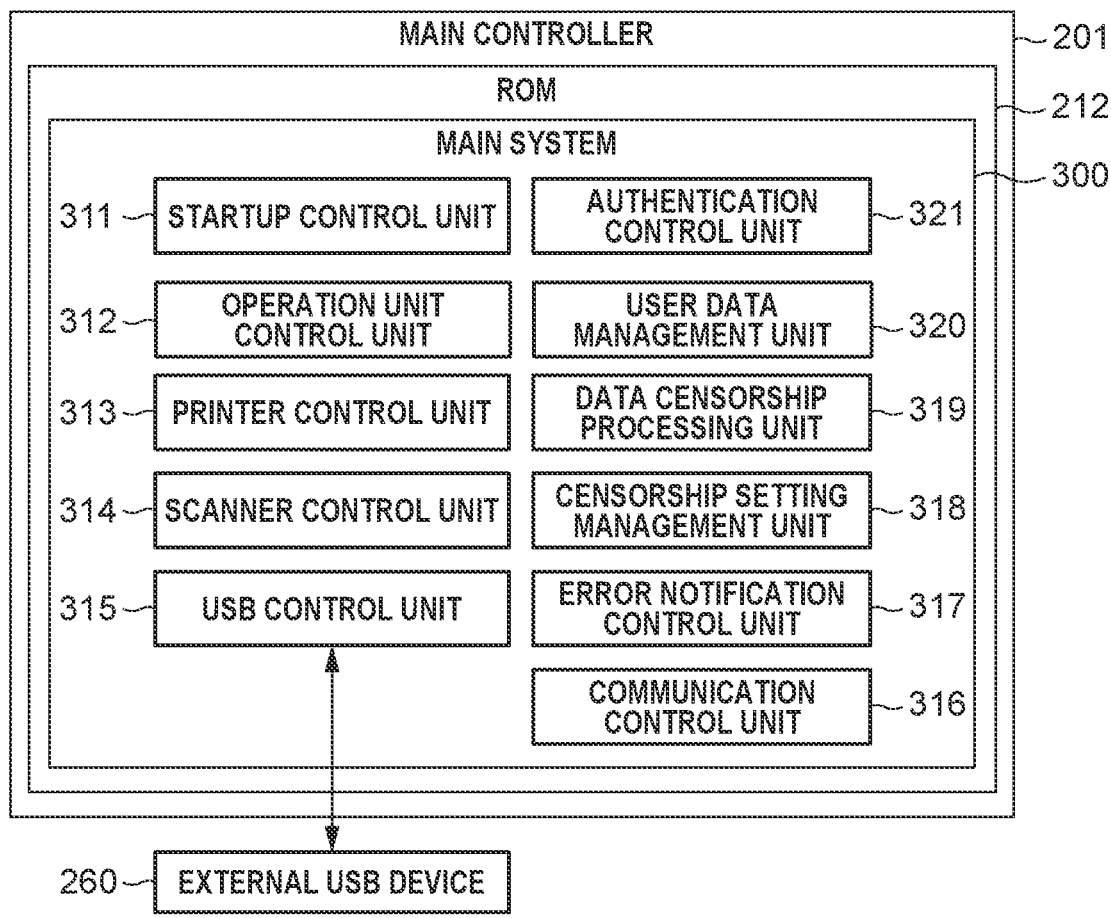
FIGS. 3A and 3B are block diagrams respectively illustrating examples of software configurations of the multifunction peripheral and the print management server according to one or more aspects of the present disclosure.

FIG. 3A is a block diagram illustrating an example of a software configuration of the multifunction peripheral 1000 according to the present exemplary embodiment. Software modules illustrated in FIG. 3A are implemented by the CPU 211 executing the programs loaded into the RAM 213.

A main system 300 includes the following modules. A startup control unit 311 is a program for controlling processing at startup of the multifunction peripheral 1000, and activates an operating system (OS) of the main controller 201 to start a basic system for operating various kinds of programs. An operation unit control unit 312 is a program for controlling the operation unit 230 via the operation unit I/F 216. A printer control unit 313 is a module for controlling printing by the printer unit 240. A scanner control unit 314 is a module for executing a function of document reading by the scanner unit 250. A USB control unit 315 is a program for controlling the external USB device 260 via the USB-host I/F 219. A communication control unit 316 is a module for controlling, via the network I/F 220, a plurality of communication protocols supported by the multifunction peripheral 1000. An error notification control unit 317 controls error notification to be provided to the operation unit 230 or an external apparatus connected via the network 100 if a problem is detected in content of print data during print data censorship processing.

A censorship setting management unit 318 is a program for managing censorship keyword setting. The censorship setting management unit 318 provides set values relating to the print data censorship processing, including a censorship keyword (hereinafter also referred to as a keyword) input by an administrator managing the multifunction peripheral 1000, to a data censorship processing unit 319 at the time of the print data censorship processing. The keyword is an example of predetermined text data to be restricted from being output by censorship.

The data censorship processing unit 319 is a program for controlling the print data censorship processing based on the keyword(s) registered in the censorship setting management unit 318.

A user data management unit 320 is a program for managing user data on users who are allowed to use the multifunction peripheral 1000. An authentication control unit 321 controls authentication of a user requesting authentication on the multifunction peripheral 1000, based on the user data registered in the user data management unit 320.

Figure 3B:
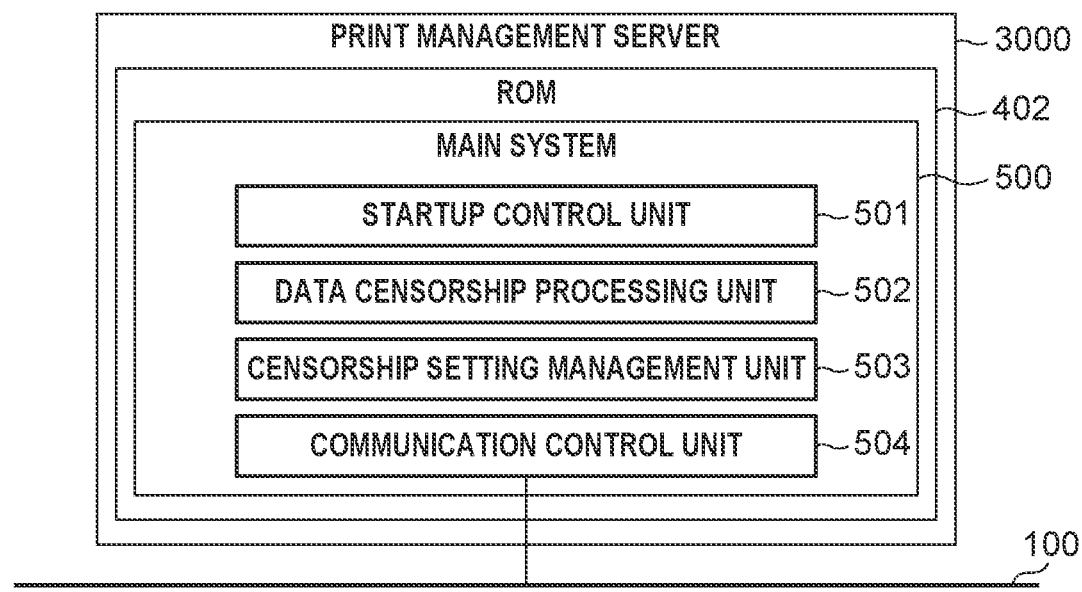

FIG. 3B is a block diagram illustrating an example of a software configuration of the print management server 3000 according to the present exemplary embodiment. Software modules illustrated in FIG. 3B are implemented by the CPU 401 executing the programs loaded into the RAM 403.

A main system 500 includes the following modules. A startup control unit 501 is a program for controlling processing at startup of the print management server 3000, and activates an OS of the print management server 3000 to start a basic system for operating various kinds of programs.

A communication control unit 504 is a module for controlling, via the network I/F control unit 405, a plurality of communication protocols supported by the print management server 3000.

A censorship setting management unit 503 is a program for managing censorship keyword setting later.

A data censorship processing unit 502 is a module for controlling the print data censorship processing based on the keyword(s) registered in the censorship setting management unit 503.

In the sequences and flowcharts to be described below, processing performed by the print management server 3000 is implemented by the CPU 401 executing the above-described software modules stored in any of the storage units, i.e., the ROM 402, the RAM 403, and the HDD 404.

Figure 4B:
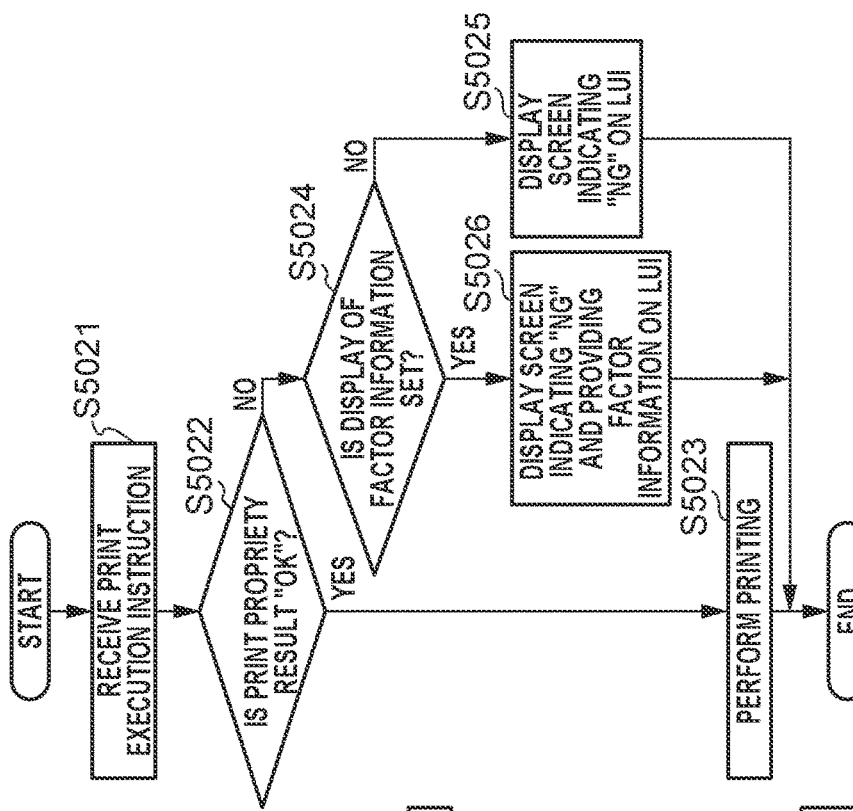
FIG. 4B is a flowchart illustrating an example of processing by the multifunction peripheral after issue of a print execution instruction by a user according to one or more aspects of the present disclosure.
Figure 4A:
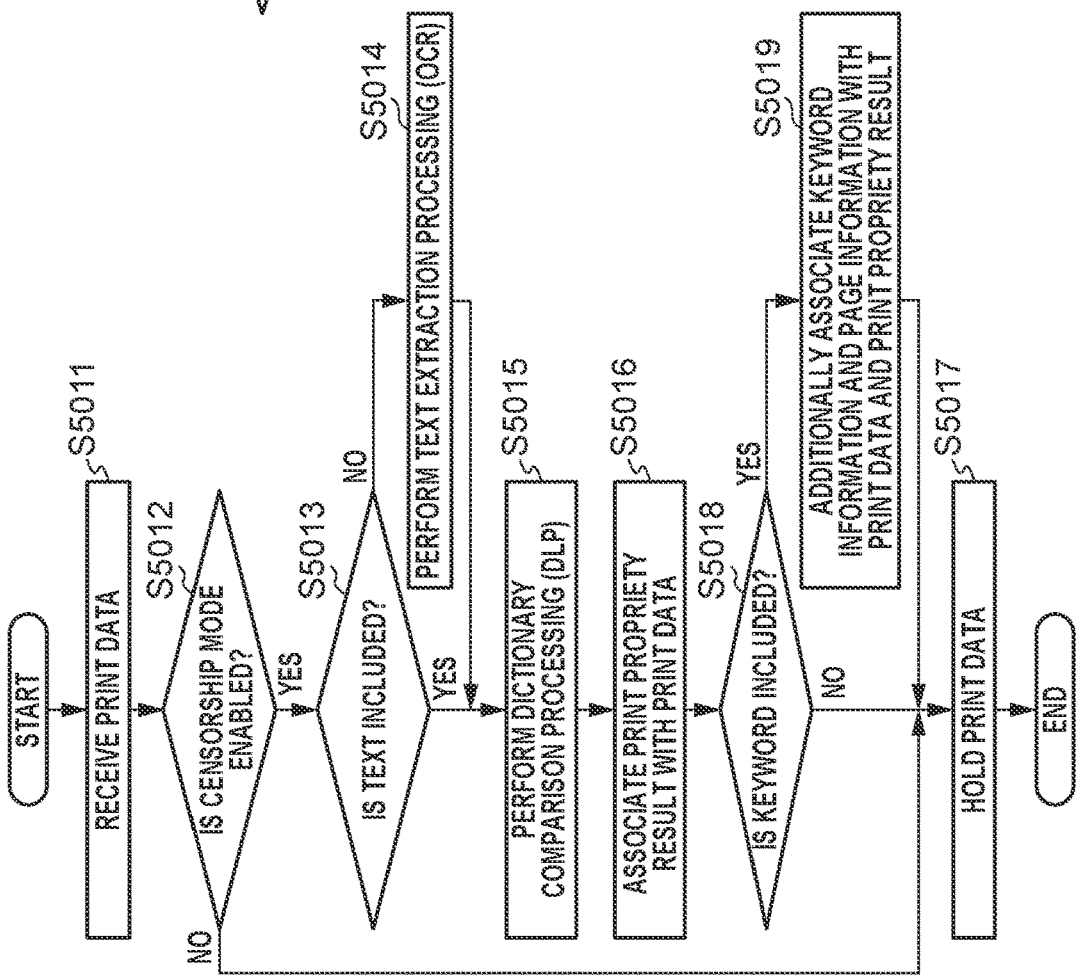
FIG. 4A is a flowchart illustrating an example of processing by the multifunction peripheral from receiving print data to holding the print data according to one or more aspects of the present disclosure.

A flowchart illustrated in FIG. 4A is started when print data is input from the PC 2000 to the multifunction peripheral 1000 according to the present exemplary embodiment. The flowchart in FIG. 4A illustrates an example of processing by the multifunction peripheral 1000 from receiving to holding the input print data. Programs for implementing the operation in the flowchart are stored in the flash memory 215, and loaded into the RAM 213 by the CPU 211. The CPU 211 executes the loaded programs to perform the processing in FIG. 4A.

Upon power-on of the multifunction peripheral 1000, the CPU 211 can start the processing in FIG. 4A. In step S5011, the multifunction peripheral 1000 receives the print data input by the user. More specifically, the user transmits the print data from the PC 2000 to the multifunction peripheral 1000 via the network 100. The format of the print data input in step S5011 is not particularly limited, and the print data may be data in a portable document format (PDF) or data in a page description language (PDL) format.

In step S5012, the main controller 201 acquires the set values registered in the censorship setting management unit 318. The main controller 201 then determines whether a censorship mode of the multifunction peripheral 1000 is enabled. In a case where the censorship mode of the multifunction peripheral 1000 is enabled (YES in step S5012), the processing proceeds to step S5013. In a case where the censorship mode of the multifunction peripheral 1000 is disabled (NO in step S5012), censorship is not performed and the processing proceeds to step S5017.

In step S5013, the data censorship processing unit 319 determines whether text is included in the print data. In a case where the data censorship processing unit 319 determines that no text is included in the print data (NO in step S5013), the processing proceeds to step S5014. In a case where the data censorship processing unit 319 determines that text is included in the print data (YES in step S5013), the processing proceeds to step S5015. The text described here is, for example, text information of PDL data or searchable PDF.

In step S5014, the data censorship processing unit 319 performs text extraction processing (optical character reader (OCR)) on the print data to extract text information from the print data. The processing then proceeds to step S5015. The processing in step S5014 can be performed by the cloud storage 4000 receiving a request from the multifunction peripheral 1000 instead of the multifunction peripheral 1000.

In step S5015, the data censorship processing unit 319 performs processing (dictionary comparison processing or data loss prevention (DLP)) for determining whether a censorship keyword is included in the text of the print data. In a case where a censorship keyword is included in the text, the data censorship processing unit 319 determines that the print data is unprintable. In a case where a censorship keyword is not included in the text, the data censorship processing unit 319 determines that the print data is printable. The censorship keyword is a word registered in the censorship setting management unit 318 by the administrator, and the registration method will be described below. The processing then proceeds to step S5016.

The data censorship processing unit 319 may be included in the cloud storage 4000. In this case, the multifunction peripheral 1000 transmits the print data to the data censorship processing unit 319 and makes an inquiry. The cloud storage 4000 then transmits a censorship result to the multifunction peripheral 1000. The processing then proceeds to step S5016.

In step S5016, the main controller 201 performs processing for associating a result of the determination in step S5015 (a print propriety result) with the print data. The processing then proceeds to step S5018.

In step S5018, the main controller 201 determines whether a censorship keyword is determined to be included in the text of the print data in step S5015. In a case where a censorship keyword is not included in the text (NO in step S5018), the processing proceeds to step S5017. In a case where a censorship keyword is included in the text (YES in step S5018), the processing proceeds to step S5019.

In step S5019, the main controller 201 performs the following processing on the print propriety result and the print data associated with each other in step S5016. More specifically, the main controller 201 performs processing for additionally associating information about the keyword determined to be included in the text in step S5015 and information about a page including the keyword, with the print propriety result and the print data. The processing then proceeds to step S5017.

In step S5017, the main controller 201 holds the print data associated with the print propriety result, in a storage medium, such as the HDD 214 or the flash memory 215, of the multifunction peripheral 1000. The print data held in step S5017 is not particularly limited and may be PDL data, or a raster image obtained as a result of rendering processing by the RIP unit 211.

FIG. 4B is a flowchart illustrating processing by the multifunction peripheral 1000 from reception of a print execution instruction from the user to printing, in the system according to the present exemplary embodiment. For example, the flowchart is started when the user performs user authentication on the multifunction peripheral 1000, and a list of hold print jobs is displayed on a local user interface (LUI) of the multifunction peripheral 1000, i.e., the operation unit 230.

In step S5021, the multifunction peripheral 1000 receives a print execution instruction from the user. More specifically, the user issues an instruction to execute a print job in the list of hold print jobs displayed on the LUI of the multifunction peripheral 1000. The list of hold print jobs is the print data (the print jobs) held in step S5017. The case has been described above where the user issues the instruction to execute the print job in the list of hold print jobs displayed on the LUI of the multifunction peripheral 1000. However, in the present exemplary embodiment, the job to be executed may be a send-job not involving printing, and the instruction received from the user at this time is not limited to the instruction to execute the job involving printing.

In step S5022, the main controller 201 determines whether the print propriety result associated with the print data corresponding to the instruction received in step S5021 is "OK". In a case where the print propriety result indicates printable print data ("OK") (YES in step S5022), the processing proceeds to step S5023, and the printer control unit 313 executes the print job. In a case where the print propriety result indicates unprintable print data ("NG") (NO in step S5022), the processing proceeds to step S5024. The job to be executed at this time is not limited to the job involving printing. For example, the job may be a send-job for transmitting data.

In step S5024, the main controller 201 acquires the set values registered in the censorship setting management unit 318, and determines whether display of a censorship error factor is set in the multifunction peripheral 1000. In a case where display of a censorship error factor is set (YES in step S5024), the processing proceeds to step S5026. In a case where display of a censorship error factor is not set (NO in step S5024), the processing proceeds to step S5025.

In step S5026, the error notification control unit 317 displays an error notification screen 700 (see FIG. 5) indicating that the print propriety result is "NG" and providing censorship error factor information 720 indicating an unprintable error factor, on the operation unit 230 of the multifunction peripheral 1000. The censorship error factor information 720 displayed on the error notification screen 700 indicates the keyword information and the page information that are the censorship error factor information associated in step S5019. When the user presses an "OK" button 710 in the error notification screen 700, the main controller 201 terminates the flowchart without performing printing. The error notification screen 700 is displayed on the operation unit 230 illustrated in FIG. 2A. Alternatively, the information displayed in the example of FIG. 5 may be provided to the PC 2000 or a smartphone and then displayed on a display of the PC 2000 or the smartphone. The user can recognize the unprintable error factor by viewing the censorship error factor information 720 on the error notification screen 700, and can execute the job by making a change to the print data and the print settings. Depending on the management operation policy, it may be desirable that the censorship error factor information 720 should not be provided to the user. Thus, whether to display the censorship error factor information 720, which indicates an unprintable error factor, can be changed in a censorship error factor display setting 604 to be described below.

In step S5025, the error notification control unit 317 displays an error notification screen indicating that the print propriety result is "NG", on the operation unit 230 of the multifunction peripheral 1000.

Unlike step S5026, the user is unable to recognize the unprintable error factor, but this makes it possible to appropriately reflect the management operation policy considering that the words used in the dictionary comparison are also security targets.

As described above, the censorship processing using keywords can be finished before the print execution instruction is received from the user. This makes it possible to prevent information leakage without increasing a time from the issue of the print execution instruction by the user to the completion of printing.

In the present exemplary embodiment, a printable job and an unprintable job are handled without distinction in the job list displayed before the start of the flowchart of FIG. 4B. Alternatively, the displayed content or the job selection control may be changed for the job determined to be unprintable. In the display of the job list, the job determined to be unprintable may be displayed so that the user can recognize in advance that the job is unprintable, or may be displayed together with censorship error factor information indicating a detected keyword and the corresponding page. Further alternatively, a message may be displayed indicating that the user can make the job printable by changing the settings to exclude the page including the keyword. Variations of the displayed content based on the print propriety result associated with the job are not limited. Yet further alternatively, the job in which the page including the keyword associated with the job is not excluded may be controlled to be displayed in an unselectable manner in the job list.

In the present exemplary embodiment, a notification that the job is unprintable is provided to the user in step S5025 or S5026 after the issue of the print execution instruction. Alternatively, to provide the notification to the user as soon as possible, the notification can be provided at the timing when the user performs the user authentication on the multifunction peripheral 1000. Further alternatively, the notification may be provided at the timing between step S5015 and step S5017 in which the dictionary comparison processing is performed after the input of the data. The notification method is not limited to the notification using the LUI, and the notification may be provided to the user by email or in cooperation with an application such as a driver of the PC 2000.

Figure 6:
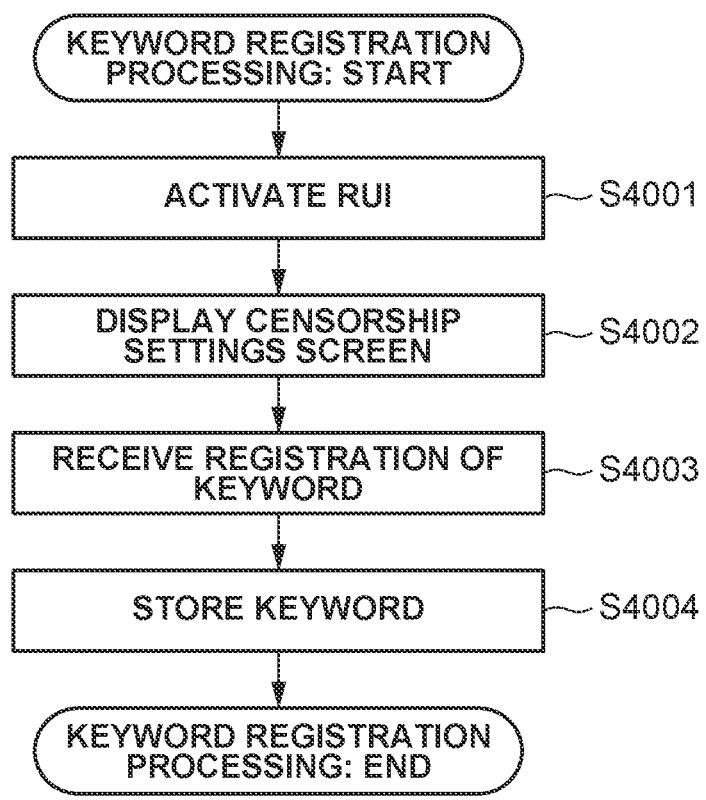
FIG. 6 is a flowchart illustrating an example of keyword registration processing according to one or more aspects of the present disclosure.

FIG. 6 is a flowchart illustrating processing for registering, as character strings, keywords to be used in the dictionary comparison processing (DLP) in step S5015. The keywords are, for example, words indicating confidential information, and the administrator managing the multifunction peripheral 1000 registers character strings. For example, if any of the keywords is included in the text of the print data, the print data is determined to include confidential information and to be unprintable. This makes it possible to reduce the security risk of printing the print data including confidential information and leading to information leakage.

In step S4001, the multifunction peripheral 1000 is connected to the PC 2000 via the network 100, and a screen enabling the user to operate the multifunction peripheral 1000 is displayed on a web browser of the PC 2000. An operation unit of the multifunction peripheral 1000 displayed on the PC 2000 or a mobile terminal is referred to as a remote user interface (RUI).

Figure 7:
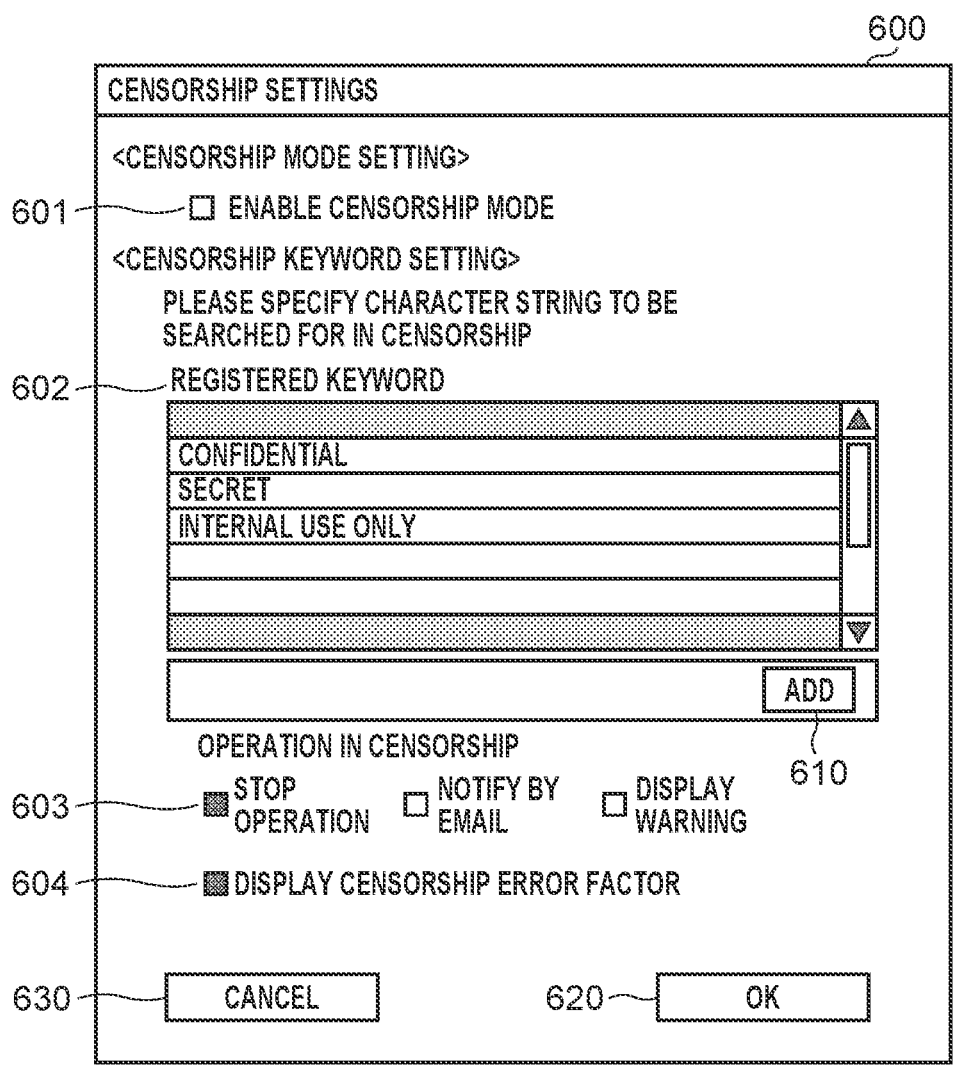
FIG. 7 is a diagram illustrating an example of a censorship settings screen according to one or more aspects of the present disclosure.

In step S4002, the main controller 201 of the multifunction peripheral 1000 displays a censorship settings screen 600 (see FIG. 7) for keyword registration on the RUI. The RUI is a browser screen displayed on the display of the PC 2000. The censorship settings screen 600 in FIG. 7 is an example of a censorship settings screen for keyword registration. The censorship settings screen 600 includes a censorship mode setting 601, a censorship keyword setting 602, a censorship operation setting 603, and the censorship error factor display setting 604. The censorship settings screen 600 further includes an "Add" button 610, an "OK" button 620, and a "Cancel" button 630. The censorship mode setting 601 is a checkbox for enabling the censorship mode. In the censorship keyword setting 602, when the user (the administrator) enters a keyword in a registered keyword list and presses the "Add" button 610, the entered keyword is added to a censorship keyword dictionary. In FIG. 7, as examples of the keywords, character strings "confidential", "secret", and "internal use only" are registered. The censorship operation setting 603 can be used to set how to operate the multifunction peripheral 1000 if the user issues an instruction to print a document in which any of the keywords is found during the censorship processing. In FIG. 7, as options for the operation, "stop operation", "notify (the administrator) by email", and "display warning (to the user)" are selectable, and the option "stop operation" is selected. However, this is merely an example, and a plurality of options may be selected at the same time. The censorship error factor display setting 604 can be used to set whether to provide information about a keyword detected in the dictionary comparison processing and information about a page including the detected keyword in a case where the print data is determined to be unprintable in the censorship processing.

When the "OK" button 620 is selected, the input settings are registered in the censorship setting management unit 318. In step S4003, the registration of a keyword by the user is received. In step S4004, the keyword entered in step S4003 is stored in the censorship setting management unit 318. After the keyword is stored, the keyword registration processing ends.

In the present exemplary embodiment, the keyword registration processing is performed via the RUI. Alternatively, a keyword may be registered via the operation unit 230 of the multifunction peripheral 1000, or a censorship keyword list on cloud may be appropriately reflected. Thus, the character string registration processing and the latest update method are not particularly limited. Accordingly, keyword updates can be performed. This means that the censorship result is changed depending on the keywords stored in the censorship setting management unit 318. As a result, even with the same print data for printing, if the print data includes a keyword newly registered in the censorship setting management unit 318, the censorship result may be "NG".

Figure 5:
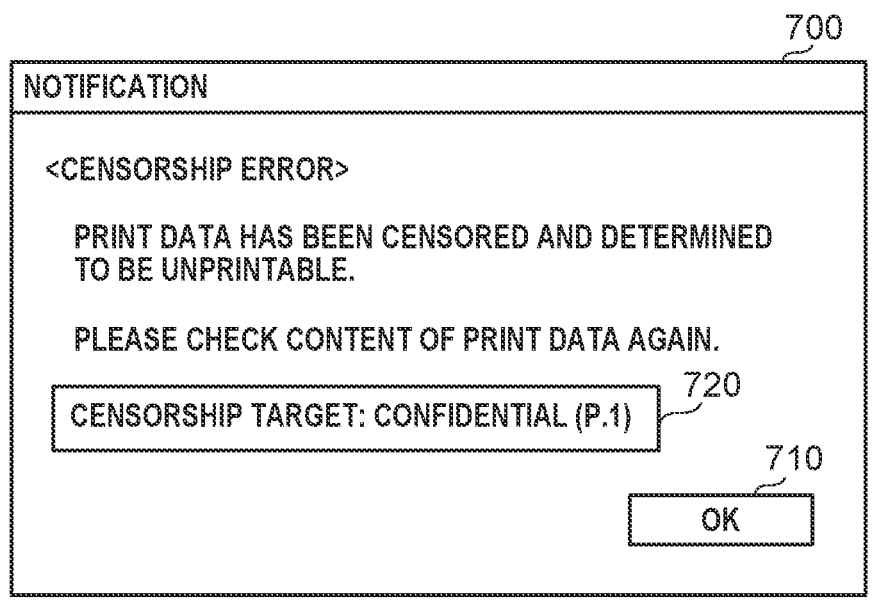
FIG. 5 is a diagram illustrating an example of an error notification screen displayed when a censorship error occurs according to one or more aspects of the present disclosure.

As a result, the display illustrated in FIG. 5 and a display illustrated in FIG. 9 (described below) are also changed.

Next, a second exemplary embodiment will be described. In the first exemplary embodiment, the processing by the multifunction peripheral 1000 from the reception of print data from the PC 2000 to the holing of the print data, and the processing by the multifunction peripheral 1000 from the reception of the print execution instruction from the user to printing have been described.

When the user issues the print execution instruction, the user can recognize the unprintable error factor by viewing the censorship error factor information 720 on the error notification screen 700. On the other hand, to enable the printing, the user is to change the print data and the print settings. In the case of changing the print settings by simply deleting the corresponding page, it is desirable that the printing be continued easily without going through the setting change processing by the user.

In the present exemplary embodiment, the above-described case is assumed. A control method in which, after the censorship error factor information 720 is provided on the error notification screen 700 when the user issues the print execution instruction, the page corresponding to the censorship error factor information 720 is deleted to enable the continuation of the printing will be described. In the present exemplary embodiment, undescribed portions, such as a network configuration, hardware and software configurations of the multifunction peripheral 1000, reception of a print execution instruction, and print execution processing are the same as those in the first exemplary embodiment. In the following, differences from the first exemplary embodiment will be mainly described.

Figure 8:
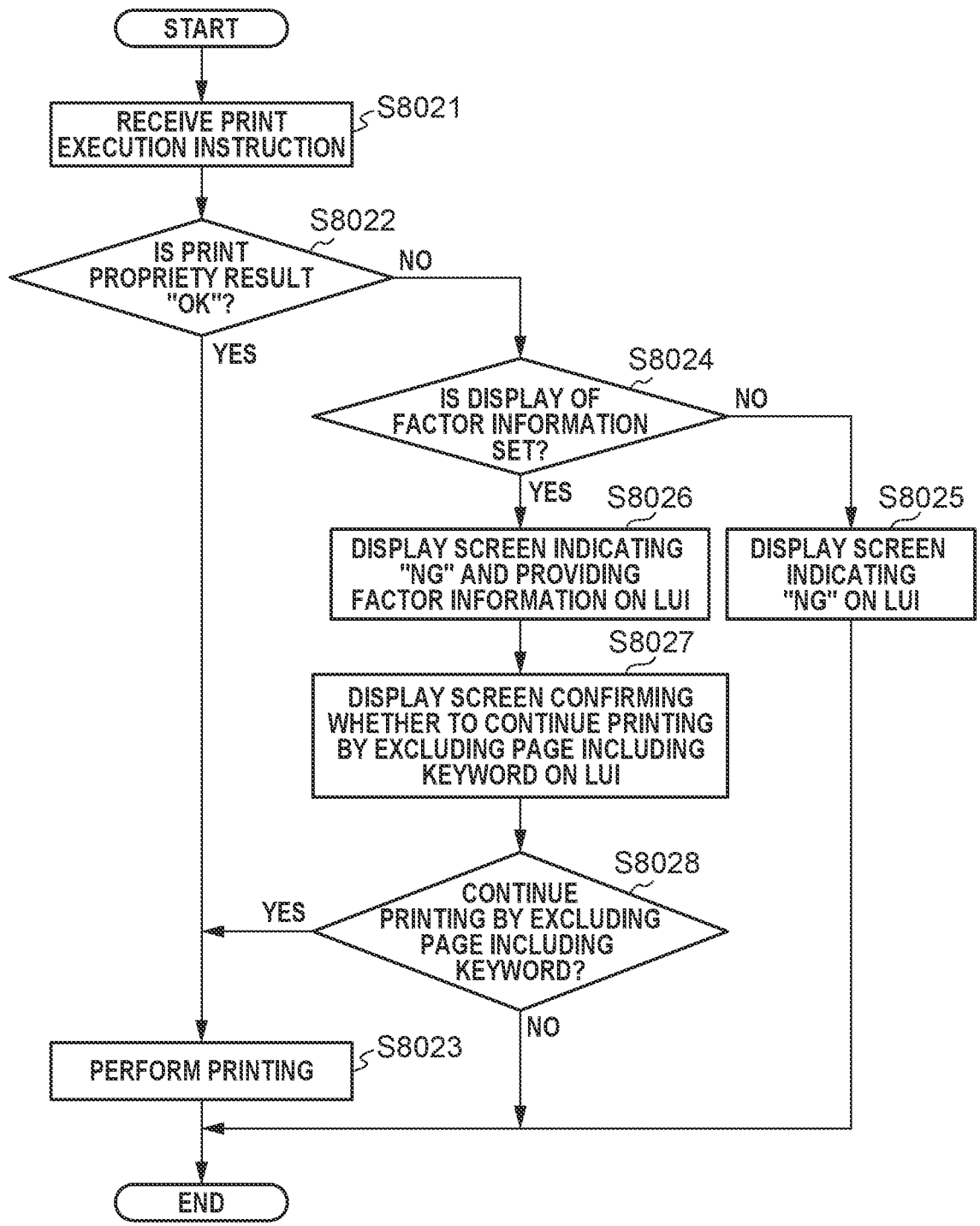
FIG. 8 is a flowchart illustrating an example of processing by a multifunction peripheral after the issue of the print execution instruction by the user according to one or more aspects of the present disclosure.

FIG. 8 is a flowchart illustrating processing by the multifunction peripheral 1000 from the reception of a print execution instruction from the user to printing, in a system according to the present exemplary embodiment.

Programs for implementing the operation in the flowchart are stored in the flash memory 215, and loaded into to the RAM 213 and executed by the CPU 211.

Steps S8021 to S8026 are respectively similar to steps S5021 to S5026 according to the first exemplary embodiment.

When the user presses the "OK" button 710 after the error notification screen 700 is displayed in step S8026, the processing proceeds to step S8027.

Figure 9:
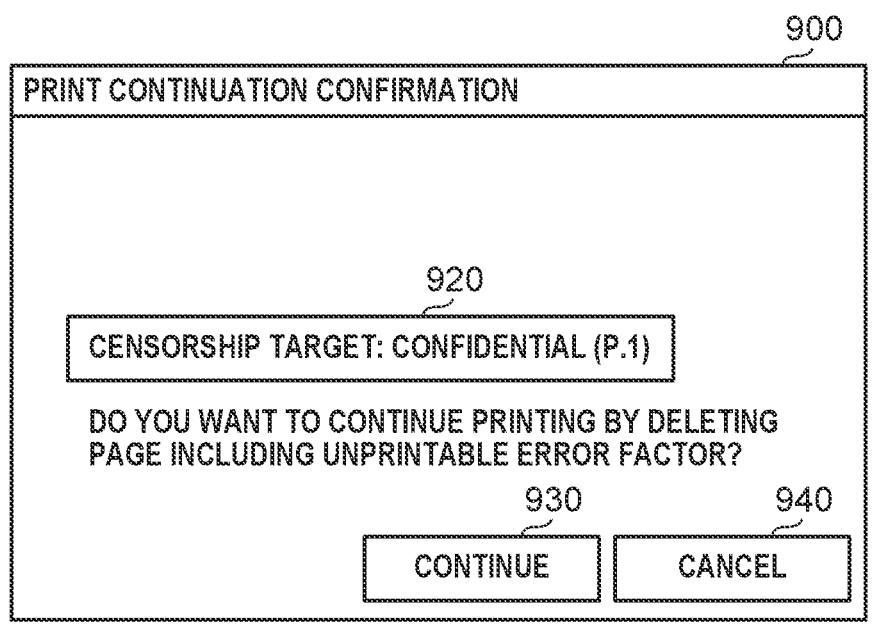
FIG. 9 is a diagram illustrating an example of a job continuation confirmation screen displayed when the censorship error occurs according to one or more aspects of the present disclosure.

In step S8027, the error notification control unit 317 displays a job continuation confirmation screen 900 (see FIG. 9). Censorship error factor information 920 displayed in the job continuation confirmation screen 900 indicates the keyword information and the page information that are the censorship error factor information associated in step S5019. If the user presses a "Continue" button 930 in the job continuation confirmation screen 900 (YES in step S8028), the page setting of the print job is changed to the setting excluding the page including the keyword indicated by the censorship error factor information 920, and the processing proceeds to step S8023. In step S8023, printing is performed with the pages excluding the page determined to be unprintable in the censorship processing, which enables the user to obtain a print output excluding the page determined to be unprintable in the censorship processing without making detailed changes to the settings. In the present exemplary embodiment, the job continuation confirmation screen 900 is displayed separately from the error notification screen 700 providing the censorship error factor information 720 indicating an unprintable error factor. Alternatively, the job continuation confirmation screen 900 and the error notification screen 700 may be simultaneously displayed as a single screen. If the user presses a "Cancel" button 940 in the job continuation confirmation screen 900 (NO in step S8028), the main controller 201 terminates the flowchart without performing printing. In the present exemplary embodiment, the page determined to be unprintable is deleted. At this time, a page number of the deleted page and information indicating that the censorship result is changed from "NG" to "OK" because of the deletion are desirably recorded in the multifunction peripheral 1000 or a storage server. For example, in a case where the first page is deleted because of confidential information and then printing is performed, log information such as "job ID: 1234, p.1 deleted, result is changed from NG to OK, printed" may be recorded. This log information indicates that the first page has been deleted, the censorship result has been changed to "OK" as a whole, and printing has been performed.

As described above, in the present exemplary embodiment, the multifunction peripheral 1000 has been described as an example of a print control apparatus. The CPU 211 of the multifunction peripheral 1000 receives print data and extracts text data from the print data. The CPU 211 then determines that predetermined text data to be restricted from being output by censorship is included in the text data extracted from the print data. This means that the CPU 211 determines that the predetermined text data to be restricted from being output by censorship is included in the print data. The CPU 211 then outputs information enabling identification of a page including the predetermined text data (the censorship keyword) in the print data. Examples of the information enabling the identification of the page include a page number.

For example, in a case where the word "Franken" is a print restriction target as a censorship target, a page including the word "Franken" is determined as an output restriction target together with the word "Franken". The term "output" includes display and print.

The operation unit 230 connected via an internal bus 10000 and a liquid crystal display (LCD) 409 connected via the network 100 will now be described. The operation unit 230 and the LCD 409 are examples of a display apparatus. The display apparatus displays the information enabling the identification of the page including the predetermined text data. For example, the display apparatus displays the information enabling the identification of the page number corresponding to the page including the predetermined text data. In addition, the display apparatus displays the word to be restricted from being printed by censorship in the page. More specifically, the display apparatus displays the page number and the keyword side by side or in proximity to each other.

The CPU 211 receives a deletion instruction to delete the page to be deleted. The CPU 211 deletes the page to be deleted, from the print data based on the received deletion instruction. For example, in a case where the fourth page of a print job including five pages includes the keyword "Franken", the display apparatus displays a message such as "The fourth page includes the keyword 'Franken'."

The CPU 211 then receives an instruction to delete the fourth page from the print data including five pages. Accordingly, the page including the keyword "Franken" is deleted, so that the page including the keyword is removed from the print job. The CPU 211 then performs control to resume the print processing on the print data from which the page to be deleted is deleted by the CPU 211.

Examples of an output unit for outputting the information may include a printing unit (e.g., the printer unit 240). The page number, which is the information enabling the identification of the page corresponding to the text data including the keyword, may be printed together with the keyword.

In place of the page number itself, a symbol such as A, B, or C may be added to the page in correspondence with the page number. In this case, the information enabling the identification of the page including the text data may be a symbol such as page B. The keyword is an example of the text information set to be restricted from being printed as the censorship target.

The exemplary embodiments of the present disclosure can be implemented by supplying programs for implementing one or more functions according to the above-described exemplary embodiments to a system or an apparatus through a network or a storage medium, and causing one or more processors in a computer of the system or the apparatus to read out and execute the programs. The exemplary embodiments of the present disclosure can also be implemented by a circuit (e.g., an application specific integrated circuit (ASIC)) for implementing the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-132246, filed Aug. 23, 2022, which is hereby incorporated by reference herein in its entirety.

What is claimed is:

1. A print control apparatus comprising:
   one or more controllers having one or more processors and one or more memories, the one or more controllers configured to:
   perform control so that, in a case where print data includes predetermined text data, the print data is not printed, and that, in a case where the print data does not include the predetermined text data, the print data is printed;
   output, in a case where the print data includes the predetermined text data and printing is not performed, a page including the predetermined text data of the print data; and
   set, in a case where the print data includes the predetermined text data and printing is not performed, whether to output information regarding the page including the predetermined text data of the print data.

2. The print control apparatus according to claim 1, further comprising a display unit for displaying a screen,
   wherein the one or more controllers output the information regarding the page including the predetermined text data of the print data by displaying the information on the display unit.

3. The print control apparatus according to claim 2, wherein the information regarding the page including the predetermined text data of the print data is a page number.

4. The print control apparatus according to claim 2, wherein the one or more controllers display, on the display unit, the predetermined text data and the information regarding the page including the predetermined text data of the print data.

5. The print control apparatus according to claim 1, wherein the one or more controllers are further configured to perform control so that, in a case where the print data includes the predetermined text data and printing is not performed, a page other than the page including the predetermined text data of the print data is printed.

6. The print control apparatus according to claim 1, wherein the one or more controllers are further configured to:
   receive the print data that has been checked; and
   perform control so that, in a case where the received print data includes the predetermined text data, the print data is printed, and that, in a case where the received print data does not include the predetermined text data, the print data is not printed.

7. The print control apparatus according to claim 6, wherein the one or more controllers are further configured to store the print data and the information regarding the page including the predetermined text data of the print data in association with each other.

8. A method for controlling a print control apparatus, the method comprising:
   performing control so that, in a case where print data includes predetermined text data, the print data is not printed, and that, in a case where the print data does not include the predetermined text data, the print data is printed;
   outputting, in a case where the print data includes the predetermined text data and printing is not performed, a page including the predetermined text data of the print data; and
   setting, in a case where the print data includes the predetermined text data and printing is not performed, whether to output information regarding the page including the predetermined text data of the print data.

9. The method according to claim 8,
   wherein the print control apparatus includes a display unit for displaying a screen, and
   wherein the method further comprises displaying, on the display unit, the information regarding the page including the predetermined text data of the print data.

10. The method according to claim 9, wherein the information regarding the page including the predetermined text data of the print data is a page number.

11. The method according to claim 9, further comprising displaying, on the display unit, the predetermined text data and the information regarding the page including the predetermined text data of the print data.

12. The method according to claim 8, further comprising performing control so that, in a case where the print data includes the predetermined text data and printing is not performed, a page other than the page including the predetermined text data of the print data is printed.

13. The print control apparatus according to claim 1, wherein the one or more controllers are further configured to:
   register the predetermined text data;
   store the registered predetermined text data; and
   perform control so that, in a case where the print data includes the stored predetermined text data, the print data is printed, and that, in a case where the print data does not include the stored predetermined text data, the print data is not printed.

14. The print control apparatus according to claim 1, wherein the one or more controllers are further configured to check whether the print data includes the stored predetermined text data.

* * * * *